United States Patent [19]
Breckner et al.

[11] Patent Number: 5,876,100
[45] Date of Patent: Mar. 2, 1999

[54] TRAILER BRAKING SYSTEM

[75] Inventors: Raymond Anthony Breckner; Dennis John Finley, both of Surrey, Canada

[73] Assignee: Raymond A. Breckner, Surrey, Canada

[21] Appl. No.: 742,637

[22] Filed: Nov. 1, 1996

[51] Int. Cl.$^6$ .................................................. B60T 13/00
[52] U.S. Cl. .............................. 303/7; 303/15; 303/976; 188/171
[58] Field of Search .............................. 303/7, 3, 15, 20, 303/9.76; 188/171

[56] References Cited

U.S. PATENT DOCUMENTS

| | | | |
|---|---|---|---|
| 3,561,573 | 2/1971 | Allen, Jr. .................................. | 303/3 X |
| 3,768,870 | 10/1973 | Howard ....................................... | 303/7 |
| 5,129,712 | 7/1992 | Feldmann et al. ......................... | 303/15 |
| 5,626,402 | 5/1997 | Saffran ....................................... | 303/7 |

*Primary Examiner*—Peter M. Poon
*Attorney, Agent, or Firm*—C. A. Rowley

[57] ABSTRACT

A trailer or towed vehicle braking system incorporates a master hydraulic cylinder, the piston of which is biased to apply pressure to the slave cylinders in the braking system and wherein an electric high torque mechanism, when operated at high electric power, overcomes the biasing force to apply no pressure to the slave cylinders. When the electric power to the high torque system is reduced, the pressure applied by the master cylinder is increased. The amount of electric power applied to the high torque motor is preferably controlled based on the braking pressure being applied in the towing vehicle.

20 Claims, 1 Drawing Sheet

TRAILER BRAKING SYSTEM

FIELD OF THE INVENTION

The present invention relates to a trailer braking system, more particularly, the present invention relates to an electrically operated hydraulic braking system for a towed vehicle.

BACKGROUND OF THE INVENTION

Generally, braking systems for a recreational towed vehicle such as a travel trailer or the like operate based on electric signal derived from a towing vehicle that controls the electric power of electro-motive force (EMF) applied to a solenoid or the like to adjust the braking pressure applied by the solenoid to the brake pad of the trailer brake.

It is also common practice to use what is known as a surge brake which mounts on the tongue and applies braking pressure based on the pressure exerted between the towed vehicle and the towing vehicle to apply the appropriate braking pressure to the hydraulic brake cylinders in the towed vehicle.

In larger trailers such as semi-trailers or the like, the interconnection between the towing vehicle and the towed vehicle is generally pneumatic and the pneumatic pressure is used to apply the appropriate braking forces to the trailer wheels. These systems generally include some form of fail safe provision, for example, if a pneumatic pressure falls below a specific level, a mechanical braking system on the trailer is released and locks on.

Electric braking systems are weak in that the maximum braking pressure that may be applied to the brake pads is limited. This type of brake requires an electric input e.g. an EMF or the brakes cannot be applied, thus, they are not fail safe (cannot apply braking force if the power is cut off) unless a suitable source of power is available on the towed vehicle and is activated when the EMF from the towing vehicle is cut-off or disconnected.

U.S. Pat. No. 3,768,870 issued Oct. 30, 1973 to Howard describes an electrically controlled hydraulic braking system for a towed vehicle. In this system a pump is used to generate the hydraulic braking pressure in the towed vehicle and the applied brake pressure in the towed vehicle is compared with the brake pressure in the tractor or towing vehicle and the pressure in the towed vehicle is modulated to correspond with that in the towing vehicle. This system is relatively complex and has no fail safe feature.

U.S. Pat. No. 5,129,712 issued Jul. 14, 1992 the inventors Feldmann et al. discloses a braking system wherein the braking pressure applied in the towing vehicle is transformed into an electrical signal and the electric signal is used to modulate the pressure applied in the braking system on the towed vehicle. This system is also not a fail safe system.

BRIEF DESCRIPTION OF THE PRESENT INVENTION

It is an object of the present invention to provide an electrically controlled hydraulic braking system for a towed vehicle.

It is a further object of the present invention to provide a fail safe electrically controlled hydraulic braking system for a towed vehicle.

Broadly, the present invention relates to an electrically controlled hydraulic braking system for a towed vehicle comprising on said towed vehicle a hydraulic circuit having brake pressure applying means and a hydraulic pressure generating means in said circuit to adjust hydraulic braking pressure in said hydraulic circuit, a high torque electric motor means, means for applying electric power to said high torque electric motor means, a movable element, means biasing said moveable element in a first direction, connecting means connecting said movable element with said high torque electric motor means for relative movement therebetween, said high torque electric motor means being set up so that when electric power applied to said high torque electric motor means is sufficient to overcome said biasing means said high torque electric motor moves said moveable element in a second direction different from said first direction, means for connecting said moveable element to said hydraulic pressure generating means so that the position of said moveable element as determined by the amount of electric power applied to said high torque electric motor means governs the hydraulic pressure in said hydraulic circuit for applying braking pressure, movement of said moveable means in said first direction by said biasing means increasing the pressure in said hydraulic circuit and movement in said second direction decrease pressure in said hydraulic circuit.

Preferably, said braking system further comprises on a towing vehicle, means for regulating electric power applied by said means for applying said electric power to said electric high torque electric motor, said means for regulating electric power, said means for applying said electric power, said high torque electric motor means and said biasing means being coordinated to position said movable element in accordance with said electric power applied by said means for applying said electrical power to said high torque electric motor means to tend to increase said hydraulic pressure when said power applied to said high torque electric motor is reduced.

Preferably, said high torque electric motor means comprises a rotary low amperage electric motor having a shaft and wherein said connecting means provides a threaded connection between said movable element and said shaft.

Preferably said connecting means comprises a ball screw means.

Preferably, said means for regulating electrical power comprises means for sensing braking pressure applied in said towing vehicle and means for adjusting said means for regulating in accordance with said braking pressure sensed.

Preferably, said means for regulating electrical power will further comprise means for calibrating the electro-motive force applied with the braking pressure sensed.

Preferably, said means for calibrating will further comprise means for overriding and manually adjusting the electric power transmitted to said means for applying.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
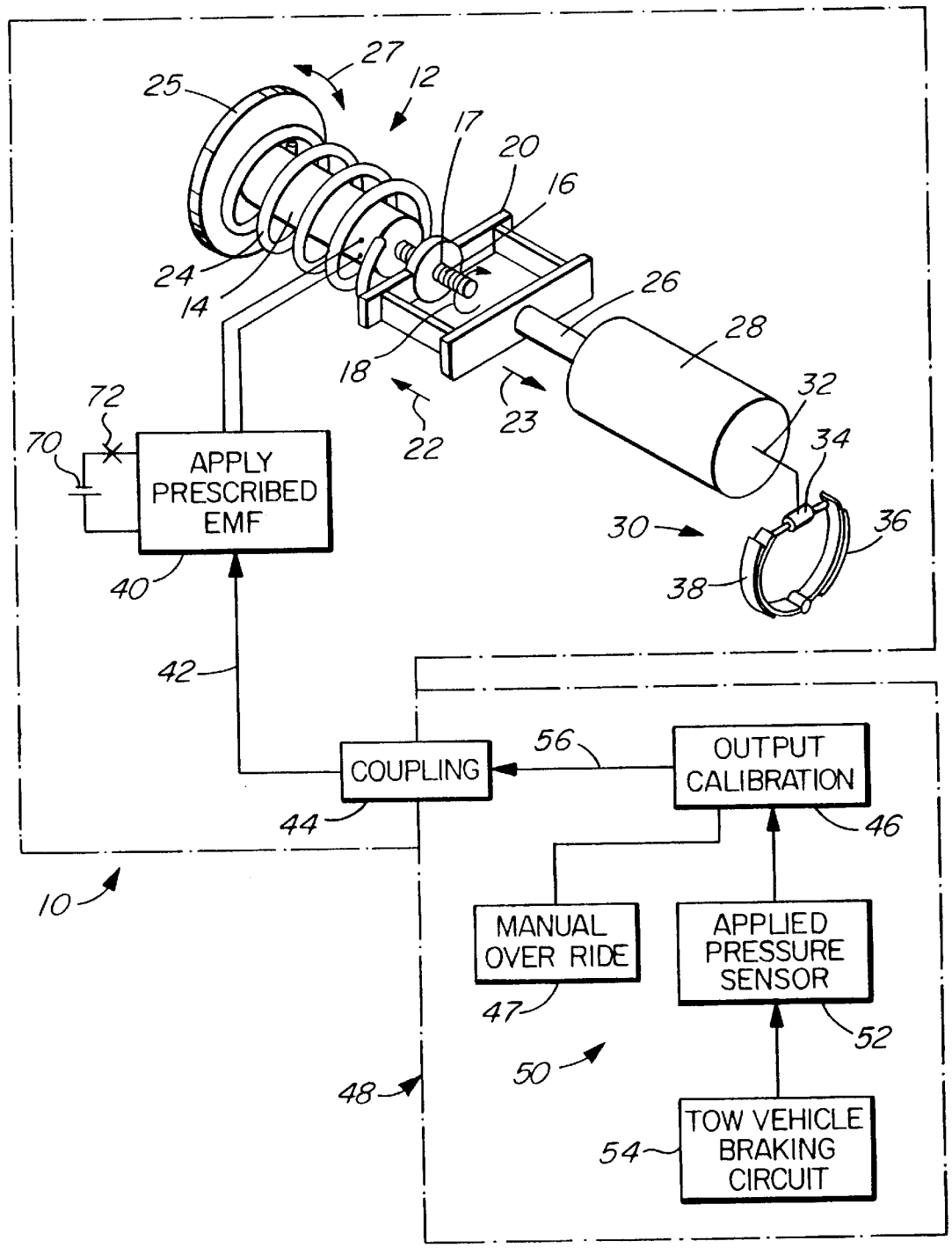
FIG. 1 is a schematic illustration of the braking system of the present invention.

As shown, the braking system of a towed vehicle 10, schematically represented by the dot-dash line, includes a brake pressure applying system 12 which in the illustrated arrangement is composed of a low ampere high torque electric motor 14 having an output shaft 16 that is rotated as indicated by the arrow 18 when sufficient electric power is applied to the motor 14. The shaft 16 is threaded and rotation of the shaft 16 in the direction of the arrow 18 tends to move a moveable element 20 via threaded engagement with the shaft in the direction of the arrow 22.

Generally the low ampere motor will require less than about 5 amperes if the system is used with a conventional 12 volt power source on the towing vehicle. The term high torque is intended to mean a motor that generates a high torque for a given power application and thus will normally have a low rate of rotation (rpm) to provide higher torque. With the present invention it obviously must develop sufficient torque to move the moveable element against the biasing system as will be described below. In one particular embodiment the motor 14 was capable of developing 70 inch pounds of torque.

In the illustrated embodiment a compression spring 24 with a force sufficient to apply the required pressure to hydraulic circuit 30 to be described below is compressed between a fixed element 25 and the element 20. This spring 24 tends to force the movable element 20 in a direction indicated by arrow 23 i.e. opposite to the direction 22 relative to the shaft 16. The motor 14 when it receives sufficient power applies, via a threaded type connection between the shaft 16 and the moveable member 20 schematically represented by the element 17, sufficient force to the moveable member 20 to compress the spring 24 and move the element 20 in the direction 22 which as will be explained below tends to reduce the hydraulic pressure in the hydraulic braking circuit 30.

The connection 17 must be efficient and therefore it is preferred to use a high efficiency ball screw to form the connection 17 between the shaft 16 and the moveable element 20.

While a spring 24 has been shown it will be apparent that other means may be used to apply a biasing force to the moveable element to move the element to apply increased pressure to the hydraulic circuit 30.

The movable element 20 is connected to a piston or the like 26 which forms the movable piston for the hydraulic master cylinder 28. The hydraulic pressure generated in the master hydraulic cylinder 28 increases as the piston 26 is driven in a direction 23 by the spring 24. This hydraulic pressure is applied to the braking system schematically indicated at 30 i.e. the pressure in the line 32 to the slave cylinder 34 which applies pressure to the brake pads 36 and 38, is increased as the pressure in the master cylinder 28 is increased.

The towed vehicle braking system 30 as schematically illustrated controls only a single brake cylinder 34, obviously, a number of different brake cylinder maybe pressurized by the master cylinder 28, generally the same number of brake cylinder as there are wheels on the towed vehicle. Similarly, the braking system, though indicated as being a drum type brake, could equally well be another form of braking system such as a disk braking system or the like.

A prescribed amount of electric power i.e. electromotive force (EMF), is applied to the system 12 in particular to the electric-motor 14 via the power applicator 40 which derives its input or input signal from line 42 connected via a coupling 44 to output calibrator 46 that forms part of the control system 50 in the towing vehicle represented by the dot dash line 48.

The control system 50 further includes a manual override 47 which overrides the calibrator 46 and directly applies a selected voltage (depending on the position of the manual override) to the coupling 44 thereby to the applicator 40. However, for normal or automatic operation, the towing vehicle control system 50 will include an applied brake pressure sensor 52 which senses the amount of braking pressure being applied in the towing vehicle as indicated at 54 and feeds this information to the calibration unit 46 which applies the appropriate power via line 56 to the coupling 44 which transfers it via line 42 to the electric power or EMF applicator 40 which applies the appropriate power or EMF to the motor 14 which thereby defines the driving force of the motor 14.

The electric power or EMF applied may be controlled in any suitable manner e.g. by pulse width or frequency modulation which controls the time during which power is delivered. For example, the longer the width or length of each power pulse the higher the power applied to the motor 14. The pulse width or frequency may be defined by the calibrator 46 directly or the signal generated by the calibrator 46 used to define the pulse width or frequency generated, for example, by the applicator 40.

The higher the EMF applied to the motor 14, the greater the force tending to rotate the shaft 16 and move the element 20 in the direction of the arrow 22 and thereby reduce the pressure applied via the master cylinder 28. Thus, in operation, as the braking pressure sensed in the towing vehicle via sensor 52 is increased the power applied to the motor 14 is decreased so that the spring 24 forces the element 20 and thus, the piston 26 in the direction of the arrow 23 to increase the braking pressure applied in the towed vehicle.

As above indicated the biasing force applied to the element 20 is resisted by a force which is dependent on the power applied to the motor 14 i.e. the torque applied to the shaft 16 which rotates the shaft 16 and drives the element 20 in the direction of the arrow 22. Under normal operating conditions when there is no pressure sensed via the sensor 52, i.e. or minimum pressure sensed by the sensor 52 in the towing vehicle braking circuit 54, a maximum output is generated by the output calibrator 46 to apply the maximum EMF from the applicator 40 to the motor 14 and thereby drive the element 20 in the direction of the arrow 22 and overcome the spring 24 pressure to relieve the pressure in the circuit 30. When a higher pressure is sensed by the sensor 52, the power output of the unit 40 is reduced so that the EMF applied to the motor 14 is reduced and the spring 24 moves the element 20 in the direction 23 which drives the piston 26 to apply increased pressure to the hydraulic cylinder 28 and causes relative rotation between the shaft 16 and element 20 through the connection 17. The increased pressure in the cylinder 28 increases the pressure in the circuit 30 and drives the slave cylinders 34 to apply the brakes in the towed vehicle.

It will be apparent that when a given (constant) pressure is applied in the towed vehicle, the amount of torque applied to the shaft 16 by the motor 14 is sufficient to prevent rotation of the shaft 16 by the force applied to the shaft 16 by the pressure biasing the element 20 in the direction of the arrow 23 and is insufficient to rotate the shaft 16 to move the moveable element 20 against the biasing force i.e. the torque applied via the motor 14 balances the torque applied by the biasing means 24.

Thus, to relieve the brake pressure in the towed vehicle, the shaft 16 is rotated by the motor 14 in a direction to retract the element 20 and compress the spring 24. When the EMF applied to the motor 14 is reduced, the shaft 16 is rotated in the opposite direction by the forces applied via the biasing means (compression spring 24) through the connection 17 between shaft 16 and the element 20 to unthread the element 20 and thus, move the element 20 in the direction of the arrow 23 and extend the cylinder or piston 26 into the master cylinder 28 in the direction of the arrow 23 and increase the pressure.

It is important that the number of revolutions of the shaft or more accurately the time required to apply braking pressure to the circuit 30 from the time a signal is sent from the towing vehicle e.g. tractor be as short as possible, thus the required range of relative movement between the shaft 16 and element 20 must be small. When the pressure is in circuit 30 is minimized for free running there should still be sufficient pressure in the circuit 30 to take up any slack in the mechanical system associated with the brakes so that the braking system is in a ready position and the braking action is instantaneous.

It will be apparent that if the EMF applied via the applicator 40 is reduced to 0, the spring 24 will force the element 20 and thus, the piston 26 in the direction of the arrow 23 and apply a maximum pressure to the hydraulic cylinder 28 and thus to the braking circuit 30 to provide a fail safe system.

It may be desirable to provide a battery on the trailer or towed vehicle as indicated at 70 and to use a switch 72 to operate the motor 14 to relieve the pressure so that the vehicle may be moved when disconnected from the controlling circuit in the towing vehicle. Other means such as a lockout system may be employed to permit movement of the towed vehicle when disconnected from the towing vehicle.

In some more sophisticated embodiments (not shown) it may be desirable to sense the pressure in the circuit 30 and correlate it with the corresponding pressure as sensed in the towed vehicle and to match the braking forces applied in the two vehicle in a selected ratio.

Having described the invention, modifications will be evident to those skilled in the art without departing from the scope of the invention as defined in the appended claims.

We claim:

1. An electrically controlled hydraulic braking system for a towed vehicle comprising on said towed vehicle a hydraulic circuit having brake pressure applying means and a hydraulic pressure generating means in said circuit to adjust hydraulic braking pressure in said hydraulic circuit, a high torque electric motor, means for applying electric power to said high torque electric motor, a movable element, means biasing said moveable element in a first direction, connecting means connecting said movable element with said high torque electric motor for relative movement therebetween, said high torque electric motor being set up so that when sufficient electric power is applied to said high torque electric motor to overcome said biasing means said high torque electric motor moves said moveable element in a second direction different from said first direction, means for connecting said moveable element to said hydraulic pressure generating means so that the position of said moveable element as determined by the amount of electric power applied to said high torque electric motor governs the hydraulic pressure in said hydraulic circuit for applying braking pressure, movement of said moveable means in said first direction by said biasing means increasing the pressure in said hydraulic circuit and movement in said second direction decreasing pressure in said hydraulic circuit.

2. An electrically controlled hydraulic braking system for a towed vehicle as defined in claim 1 wherein said braking system further comprises, on a towing vehicle, means for regulating electric power applied by said means for applying said electric power to said electric high torque electric motor, said means for regulating electric power, said means for applying said electric power, said high torque electric motor and said biasing means being coordinated to position said movable element in accordance with said electric power applied by said means for applying to said high torque electric motor to tend to increase said hydraulic pressure when said power applied to said high torque electric motor is reduced.

3. An electrically controlled hydraulic braking system for a towed vehicle as defined in claim 2 wherein said means for regulating electric power comprises means for sensing braking pressure applied in said towing vehicle and means for adjusting said means for regulating electric power in accordance with said braking pressure sensed.

4. An electrically controlled hydraulic braking system for a towed vehicle as defined in claim 3 wherein said means for regulating electric power further comprises means for calibrating the electro-motive force applied with the braking pressure sensed.

5. An electrically controlled hydraulic braking system for a towed vehicle as defined in claim 4 wherein said means for calibrating further comprises means for overriding and manually adjusting the electric power transmitted to said means for applying.

6. An electrically controlled hydraulic braking system for a towed vehicle as defined in claim 2 wherein said electric high torque motor means comprises a rotary motor having a shaft and wherein said connecting means provides a threaded connection between said movable element and said shaft.

7. An electrically controlled hydraulic braking system for a towed vehicle as defined in claim 6 wherein said connecting means comprises a ball screw means.

8. An electrically controlled hydraulic braking system for a towed vehicle as defined in claim 7 wherein said means for regulating electric power comprises means for sensing braking pressure applied in said towing vehicle and means for adjusting said means for regulating electric power in accordance with said braking pressure sensed.

9. An electrically controlled hydraulic braking system for a towed vehicle as defined in claim 8 wherein said means for regulating electric power further comprises means for calibrating the electro-motive force applied with the braking pressure sensed.

10. An electrically controlled hydraulic braking system for a towed vehicle as defined in claim 9 wherein said means for calibrating further comprises means for overriding and manually adjusting the electric power transmitted to said means for applying.

11. An electrically controlled hydraulic braking system for a towed vehicle as defined in claim 6 wherein said means for regulating comprises means for sensing braking pressure applied in said towing vehicle and means for adjusting said means for regulating in accordance with said braking pressure sensed.

12. An electrically controlled hydraulic braking system for a towed vehicle as defined in claim 11 wherein said means for regulating further comprises means for calibrating the electro-motive force applied with the braking pressure sensed.

13. An electrically controlled hydraulic braking system for a towed vehicle as defined in claim 12 wherein said means for calibrating further comprises means for overriding and manually adjusting the electric power transmitted to said means for applying.

14. An electrically controlled hydraulic braking system for a towed vehicle as defined in claim 2 wherein, said connecting means comprises a ball screw means.

15. An electrically controlled hydraulic braking system for a towed vehicle as defined in claim 14 wherein said means for regulating electric power comprises means for sensing braking pressure applied in said towing vehicle and means for adjusting said means for regulating electric power in accordance with said braking pressure sensed.

16. An electrically controlled hydraulic braking system for a towed vehicle as defined in claim 15 wherein said means for regulating electric power further comprises means for calibrating the electro-motive force applied with the braking pressure sensed.

17. An electrically controlled hydraulic braking system for a towed vehicle as defined in claim 16 wherein said means for calibrating further comprises means for overriding and manually adjusting the electric power transmitted to said means for applying.

18. An electrically controlled hydraulic braking system for a towed vehicle as defined in claim 1 wherein said high torque electric motor comprises a rotary low amperage electric motor having a shaft and wherein said connecting means provides a threaded connection between said movable element and said shaft.

19. An electrically controlled hydraulic braking system for a towed vehicle as defined in claim 18 wherein said connecting means comprises a ball screw means.

20. An electrically controlled hydraulic braking system for a towed vehicle as defined in claim 1 wherein said connecting means comprises a ball screw means.

\* \* \* \* \*